United States Patent
Parker et al.

(10) Patent No.: US 10,705,111 B2
(45) Date of Patent: Jul. 7, 2020

(54) SHOCK SENSOR

(71) Applicant: Robert Bosch GmbH, Stuttgart (DE)

(72) Inventors: Patrick Parker, New York, NY (US); Chungcheng Lo, Guangdong (CN); Guohong Wan, Guangdong (CN); Yaohui Zhi, Guangdong (CN); Guiping Ding, Guangdong (CN)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 14/917,588

(22) PCT Filed: Sep. 9, 2013

(86) PCT No.: PCT/CN2013/083141
§ 371 (c)(1),
(2) Date: Mar. 9, 2016

(87) PCT Pub. No.: WO2015/032094
PCT Pub. Date: Mar. 12, 2015

(65) Prior Publication Data
US 2016/0223581 A1    Aug. 4, 2016

(51) Int. Cl.
*G01P 15/00*   (2006.01)
*G08B 13/02*   (2006.01)
(Continued)

(52) U.S. Cl.
CPC .............. *G01P 15/001* (2013.01); *G01P 1/07* (2013.01); *G01P 15/0891* (2013.01);
(Continued)

(58) Field of Classification Search
CPC .... G01P 15/001; G01P 15/0891; G01P 15/18; G08B 13/02; G08B 29/22
See application file for complete search history.

(56) References Cited

U.S. PATENT DOCUMENTS 2,968,939 A * 1/1961 Preston, Jr. ............ G01N 25/14
                                                          73/25.01
3,549,264 A * 12/1970 Christie ................. G01N 21/57
                                                          356/446
(Continued)

FOREIGN PATENT DOCUMENTS

CN         2898835 Y     5/2007
CN      101065787 A    10/2007
(Continued)

OTHER PUBLICATIONS

ElectronicsTutorials, "Potentiometers": pp. 1-13 (retrieved on Feb. 2020 from https://www.electronics-tutorials.ws/resistor/potentiometer.html) (Year: 2020).*
(Continued)

*Primary Examiner* — Michele Fan
(74) *Attorney, Agent, or Firm* — Maginot, Moore & Beck LLP

(57) ABSTRACT

Disclosed is a shock sensor for detecting an attack on a facility equipped with the shock sensor, comprising: a microprocessor; a micro electromechanical system in communication with the microprocessor, the micro electromechanical system being integrated with a shock sensing device adapted to sense a shock generated by the attack in any direction and a microchip adapted to receive and store at least one parameter from the microprocessor and to analyze a shock signal generated by the shock based on the at least one parameter; and an output device connected with the microprocessor and adapted to output information based on an analysis result of the shock signal. According to the invention, the shock sensor can detect reliably any attack and has a simple circuit arrangement.

6 Claims, 1 Drawing Sheet

(51) Int. Cl.
  *G01P 15/18* (2013.01)
  *G01P 15/08* (2006.01)
  *G01P 1/07* (2006.01)
  *G08B 29/22* (2006.01)

(52) U.S. Cl.
  CPC .............. *G01P 15/18* (2013.01); *G08B 13/02* (2013.01); *G08B 29/22* (2013.01)

(56) References Cited

U.S. PATENT DOCUMENTS

| | | | | |
|---|---|---|---|---|
| 4,845,464 A * | 7/1989 | Drori | ................. | B60R 25/1004 340/429 |
| 5,181,010 A * | 1/1993 | Chick | ................. | B60R 25/1004 307/10.2 |
| 5,243,322 A * | 9/1993 | Thompson | .......... | B60R 25/1004 307/10.2 |
| 5,512,874 A * | 4/1996 | Poston | ................ | B60R 25/1007 200/52 A |
| 5,805,056 A * | 9/1998 | Mueller | ............. | B60R 25/1003 250/231.1 |
| 7,356,429 B2 | 4/2008 | Eskildsen | | |
| 2002/0021231 A1 * | 2/2002 | Schlager | ............... | B63C 9/0005 340/984 |
| 2005/0190059 A1 | 9/2005 | Wehrenberg | | |
| 2008/0210020 A1 * | 9/2008 | Bieck | ................. | B60R 21/0136 73/862.68 |
| 2009/0073803 A1 * | 3/2009 | Smith | .................... | G08B 13/04 367/13 |
| 2010/0194692 A1 * | 8/2010 | Orr | ....................... | G06F 3/0414 345/173 |
| 2011/0037588 A1 * | 2/2011 | Zeng | ..................... | G01V 1/008 340/539.1 |
| 2012/0029765 A1 * | 2/2012 | Sheffer | .................. | G08B 7/062 701/36 |
| 2013/0162365 A1 * | 6/2013 | Otaguro | ............. | G01P 15/0891 333/17.1 |
| 2014/0062692 A1 * | 3/2014 | Li | ........................ | G08B 13/189 340/521 |
| 2014/0263426 A1 * | 9/2014 | Gasper | .................. | B05B 12/081 222/52 |

FOREIGN PATENT DOCUMENTS

| | | | | |
|---|---|---|---|---|
| CN | 101634659 A | | 1/2010 | |
| DE | 44 20 431 A1 | | 12/1995 | |
| EP | 1 612 565 A2 | | 1/2006 | |
| EP | 2515282 A1 | * | 10/2012 | .............. C08B 5/36 |
| GB | 2512577 A | * | 10/2014 | ............ G08B 13/08 |

OTHER PUBLICATIONS

RS Components Ltd, "What is a DIP switch?": pp. 1-4 (retrieved on Feb. 2020 from https://uk.rs-online.com/web/generalDisplay.html?id=ideas-and-advice/dip-switches-guide) (Year: 2020).*

International Search Report corresponding to PCT Application No. PCT/CN2013/083141, dated Jun. 10, 2014 (German and English language document) (4 pages).

* cited by examiner

SHOCK SENSOR

This application is a 35 U.S.C. § 371 National Stage Application of PCT/CN2013/083141, filed on Sep. 9, 2013, the disclosure of which is incorporated herein by reference in its entirety.

TECHNICAL FIELD

The invention relates to a shock sensor for detecting an attack on a facility equipped with the shock sensor.

BACKGROUND ART

With the development of the society and technical advancement, more and more convenient facilities, such as automobiles, motorcycles, automatic teller machines (ATM) and the like, appear in our daily life. These facilities normally need to be equipped with alarm devices against an attack, and when the facilities are subjected to the attack, the alarm devices can sense the attack and generate corresponding alarms, such as sound alarms.

At present, the alarm device normally is a shock sensor. That is, it is determined whether the facilities are subjected to the attack according to a shock signal sensed by the shock sensor. To this end, the known shock sensor is provided with a sensing device for sensing the shock signal. In the prior art, a piezo bimorph is usually used as the sensing device. The shock signal sensed by the pizeo bimorph is transmitted to a processor and is analyzed by the processor.

As is well known, the piezo bimorph is an analog element and can only sense a shock in one direction. In operation, the piezo bimorph transforms a strain thereof into an analog voltage as an output signal. Therefore, the shock signal sensed actually by the piezo bimorph may not be a real shock signal and can not describe really the attack as the real shock signal generated by the attack usually has three dimensional components. Moreover, the output signal is interfered easily by many factors, such as noise, a power supply for powering the piezo bimorph, etc.

The shock sensor also needs a complicated analog electrical circuit due to the piezo bimorph, thereby causing the shock sensor unstable.

The known shock sensor mainly executes a detection method as follows. A threshold value is predetermined, the shock signal detected by the shock sensor is compared with the threshold value, and exceeding of the threshold value indicates that the facility is subjected to the attack, thus generating a corresponding alarm. In some cases, in addition that the shock signal detected by the shock sensor is compared with a threshold value, one or more judgment conditions need to be met, in order to further decrease false alarm and missing alarm. However, as described above, the shock signal sensed by the piezo bimorph may not describe really the real attack, and therefore the false alarm and missing alarm may increase so as to cause the shock sensor ineffective.

Thus, it is desirable to provide a simple and reliable shock sensor adapted to detect the shock signal describing really the attack and thereby generate the alarm properly according to the shock signal.

SUMMARY OF THE INVENTION

In view of the problems existed in the prior art, an object of the invention is to provide a more simple and reliable shock sensor for detecting an attack on a facility equipped with the shock sensor.

For achieving this object, in one aspect, the present invention provides a shock sensor for detecting an attack on a facility equipped with the shock sensor, which comprises:
 a microprocessor;
 a micro electromechanical system (MEMS) in communication with the microprocessor, the micro electromechanical system being integrated with a shock sensing device adapted to sense a shock generated by the attack in any direction and a microchip adapted to receive and store at least one parameter from the microprocessor and to analyze a shock signal generated by the shock based on the at least one parameter; and
 an output device connected with the microprocessor and adapted to output information based on an analysis result of the shock signal.

In accordance with a preferred embodiment of the invention, the shock sensor further comprises a sensitivity adjusting device connected with the microprocessor, and a sensitivity of the shock sensor can be adjusted by means of the sensitivity adjusting device.

In accordance with a preferred embodiment of the invention, the microchip is provided with a serial peripheral interface, and the microprocessor is provided with a corresponding serial peripheral interface connected with the serial peripheral interface of the microchip; or the microchip is in communication with the microprocessor in a wireless manner.

In accordance with a preferred embodiment of the invention, the shock sensing device is an acceleration sensing device; and/or the shock sensing device samples the shock signal at a sampling frequency of about 2 kHz, preferably 2 kHz; and/or the output device is an alarm device.

In accordance with a preferred embodiment of the invention, the microchip is programmable and comprises a first register for storing the at least one parameter received from the microprocessor, a second register for storing the shock signal received from the shock sensing device, a memory for storing a program sequence to analyze the shock signal, and an on-chip interrupt controller at least adapted to send an interrupt instruction to the microprocessor based on the analysis result of the shock signal.

In accordance with a preferred embodiment of the invention, the shock sensor further comprises a mode setting device connected with the microprocessor, and the shock sensor can be set to a sensitivity determining mode by means of the mode setting device; and the sensitivity of the shock sensor is determined by means of the following steps: a) setting the shock sensor to the sensitivity determining mode by means of the mode setting device and powering the shock sensor on; b) simulating a desired attack in a predetermined time period and recording an amplitude of the shock signal generated by the desired attack in the predetermined time period by means of the micro electromechanical system; and c) determining the sensitivity of the shock sensor at least based on the amplitude of the shock signal.

In accordance with a preferred embodiment of the invention, when the sensitivity of the shock sensor is determined, the shock sensor is switched from the sensitivity determining mode to another mode in which the determined sensitivity is allowed to be set by means of the sensitivity adjusting device.

In accordance with a preferred embodiment of the invention, the sensitivity adjusting device comprises a first DIP (double in-line package) switch adapted to select a sensitivity range for the shock sensor and a potentiometer (POT) adapted to set the sensitivity of the shock sensor in the selected sensitivity range; and/or the mode setting device comprises a second DIP switch.

In accordance with a preferred embodiment of the invention, the shock sensor further comprises: an additional adjusting device, in particular a third DIP switch, connected with the microprocessor, wherein a corresponding additional parameter can be set by means of the additional adjusting device, and the corresponding additional parameter is taken into account when the shock signal is analyzed; and/or a tamper switch for protecting the shock sensor itself and connected with the output device.

In accordance with a preferred embodiment of the invention, the shock sensor further comprises an indication device, in particular an LED (light emitting diode), connected with the microprocessor; the output device comprises an optical alarm device and an acoustic alarm device; and the indication device can be used for assisting in setting the sensitivity of the shock sensor and functions as the optical alarm device.

BRIEF DESCRIPTION OF THE DRAWINGS

The invention and advantages thereof will be further understood by reading the following detailed description of some preferred exemplary embodiments with reference to the drawings in which.

DETAILED DESCRIPTION OF PREFERRED EMBODIMENTS

Now, a shock sensor according to a preferred exemplary embodiment of the invention will be described with reference to FIG. 1. As previously described, the shock sensor is usually installed on some important facilities in order to detect a possible attack on the facilities and generate an alarm when the attack is determined as a real attack possibly breaking the facilities and/or causing any property loss.

Figure 1:
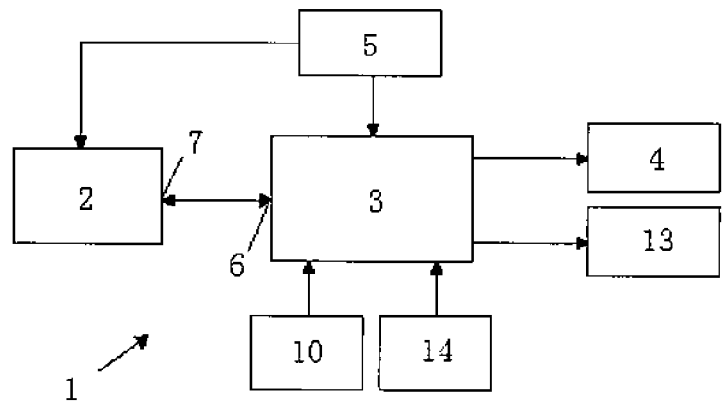
FIG. 1 is a block diagram showing essential components of a preferred exemplary embodiment of a shock sensor for sensing an attack on a facility equipped with the shock sensor.

As shown in FIG. 1, the shock sensor 1 mainly comprises a MEMS 2 at least adapted to sample a shock signal which is transmitted to the MEMS 2, a microprocessor 3 adapted to be communicated with the MEMS 2, an alarm device 4 for generating an alarm in any suitable manners (preferably in an optical and/or acoustic manner) when the real attack is detected, and a power supply 5 at least for powering the MEMS 2 and the microprocessor 3.

As further shown in FIG. 1, the alarm device 4 is connected with and controlled by means of the microprocessor 3.

As an example, the power supply 5 may be a 3 VDC power supply.

Preferably, as shown in FIG. 1, a serial peripheral interface (SPI) 6 of the microprocessor 3 is electrically connected with a SPI 7 of the MEMS 2, in order to achieve a communication between the microprocessor 3 and the MEMS 2 in a wired manner.

Figure 2:
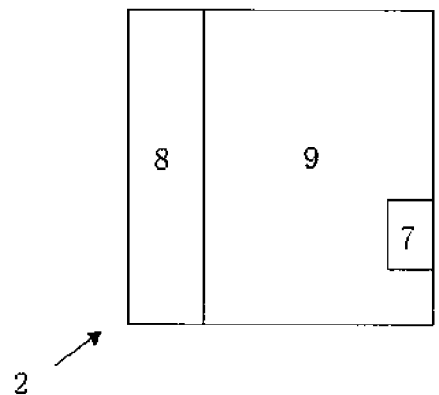
FIG. 2 is a schematic diagram showing a preferred exemplary embodiment of a MEMS of the shock sensor.

Preferably, as shown FIG. 2, the MEMS 2 is at least integrated with a shock sensing device 8 for sensing all of three dimensional components of the shock signal, and a microchip 9 at least adapted to receive and store at least one parameter from the microprocessor 3 and to analyze the shock signal based on the at least one parameter.

For example, the shock sensing device 8 samples the shock signal at a sampling frequency of 2 kHz.

Preferably, the microchip 9 is programmable and a first preprogrammed program sequence is stored in the microchip 9 to analyze the shock signal. Further, the microchip 9 at least comprises a digital interface (such as the SPI 7), a first register for storing the at least one parameter transmitted from the microprocessor 3, a second register for storing the shock signal received from the shock sensing device 8, a memory for storing the first program sequence, and an on-chip interrupt controller at least adapted to send an interrupt instruction to the microprocessor 3 according to an analysis result of the shock signal.

As an alternative, the MEMS 2 can be communicated with the microprocessor 3 in a wireless manner. In this case, the microchip 9 is provided with a wireless transceiver and the microprocessor 3 is provided with a corresponding wireless transceiver.

Preferably, the shock sensing device 8 is an acceleration sensing device. It should be understood by a person skilled in the art that the shock sensing device 8 may be any other suitable sensing device, as long as the shock signal sensed by the shock sensing device 8 is able to describe really the attack.

Preferably, the interrupt instruction is an instruction for indicating that the attack is determined as the real attack by analyzing the shock signal, and the instruction is sent immediately to the microprocessor 3 when the real attack is determined.

Preferably, a second preprogrammed program sequence is stored in a memory of the microprocessor 3 to at least control the alarm device 4 according to the interrupt instruction received from the on-chip interrupt controller of the MEMS 2. When the microprocessor 3 receives the interrupt instruction, the microprocessor 3 sends a control signal to the alarm device 4 to generate the alarm.

It may be understood by a person skilled in the art that a sensitivity of the shock sensor 1 usually needs to be adjusted when the shock sensor 1 is used in different applications and sites. Generally, as described above, the sensitivity of the shock sensor 1 corresponds to a certain threshold value, with which an amplitude of the shock signal will be compared in operation. As an example, by comparing the amplitude of the shock signal generated by the attack with the threshold value (and additionally comparing a duration of the attack with a predetermined duration), the microchip 9 analyzes the shock signal and generates the alarm when the attack is determined as the real attack.

To this end, as shown in FIG. 1, the shock sensor 1 further comprises a sensitivity adjusting device 10 for adjusting the sensitivity of the shock sensor 1. The sensitivity adjusting device 10 is connected with the microprocessor 3.

Figure 3:
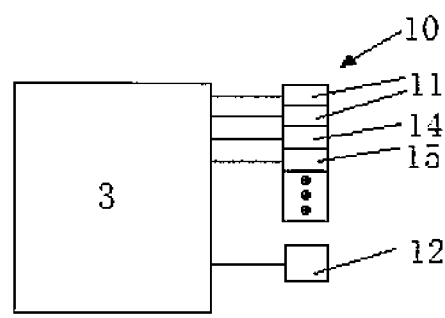
FIG. 3 is a schematic diagram showing a preferred exemplary embodiment of some components connected with a microprocessor of the shock sensor.

As shown in FIG. 3, as an example, the sensitivity adjusting device 10 comprises at least one first DIP switch 11 and a potentiometer 12 which are connected with the microprocessor 3. The first DIP switch 11 is used for selecting different sensitivity levels (ranges) for the shock sensor 1 as desired, and the potentiometer 12 is used for setting accurately the sensitivity of the shock sensor 1 in the selected sensitivity range. That is to say, the first DIP switch 11 and the potentiometer 12 cooperate with each other to set the sensitivity of the shock sensor 1. Once the first DIP switch 11 and the potentiometer 12 is adjusted well, the microprocessor 3 can determine the sensitivity of the shock sensor 1 according to adjusted positions of the first DIP switch 11 and the potentiometer 12 when the shock sensor 1 is powered on. In this case, the sensitivity of the shock sensor 1 can be maintained until the first DIP switch 11 and/or the potentiometer 12 is readjusted.

It is preferable to provide four different sensitivity levels for the shock sensor 1. In this case, the at least one first DIP switch 11 comprises two DIP switches 11, as shown in FIG. 3. Each first DIP switch 11 has two setting positions and thereby the two DIP switches 11 are able to cooperate with each other to provide four different sensitivity levels.

When the microprocessor 3 determines the sensitivity of the shock sensor 1, the threshold value corresponding to the determined sensitivity, as a parameter, is assigned to the first register of the microchip 9 by means of the microprocessor 3. Then, the microchip 9 can be used for analyzing the shock signal at least based on the determined sensitivity by using the first program sequence.

Preferably, as shown in FIG. 1, the shock sensor 1 further comprises an indication device 13 at least for assisting in adjusting of the sensitivity, which is connected with and controlled by means of the microprocessor 3. More preferably, the indication device 13 can also undertake other function, for example, generating an optical alarm when the attack is determined as the real attack.

According to a preferred embodiment of the invention, the indication device 13 may be or comprises an LED, in particular a colored LED.

For assisting in adjusting the sensitivity, as shown in FIG. 1, the shock sensor 1 preferably further comprises a mode setting device 14 connected with the microprocessor 3. The shock sensor 1 can be set to a normal working mode or a sensitivity determining mode by means of the mode setting device 14.

Preferably, the mode setting device 14 is a second DIP switch, as shown in FIG. 3.

In the normal working mode, the shock sensor 1 works normally to detect the attack. Preferably, when the shock sensor 1 is installed on the facility and set to the normal working mode by means of the mode setting device 14, the shock sensor 1 can be communicated with a control system (not shown) of the facility.

Preferably, in the sensitivity determining mode, the sensitivity of the shock sensor 1 can be determined intelligently as follows. Specifically, a process for determining the sensitivity of the shock sensor 1 comprises the following steps:

a) setting the shock sensor 1 to the sensitivity determining mode by means of the mode setting device 14 and powering the shock sensor 1 on;

b) simulating a desired attack in a predetermined time period and recording an amplitude of the shock signal generated by the desired attack in the predetermined time period by means of the MEMS 2; and c) determining the sensitivity of the shock sensor 1 at least based on the amplitude of the shock signal.

Preferably, the process for determining the sensitivity of the shock sensor 1 is carried out in the microchip 9. Of course, the process can also be carried out in the microprocessor 3.

Once the sensitivity is determined, the shock sensor 1 is set to not be in the sensitivity determining mode and the sensitivity of the shock sensor 1 is finally adjusted to the determined sensitivity by means of the sensitivity adjusting device 10 with the help of the indication device 13.

In operation, in addition to the comparison between the amplitude of the shock signal and the threshold value, an additional characteristic value of the shock signal needs to be compared with the corresponding additional threshold value to further decrease false alarm and missing alarm. To this end, the shock sensor 1 further comprises an additional setting device connected with the microprocessor 3 and adapted to set the corresponding additional threshold value. Preferably, the additional setting device is used for selecting one additional threshold from a plurality of predetermined values. In this case, the additional setting device preferably is a third DIP switch 15, as shown in FIG. 3.

As further shown in FIG. 3, the two first DIP switches 11, the second DIP switch 14 and the third DIP switch 15 preferably are integrated into a single module and the module is available from market.

Preferably, the shock sensor 1 further comprises a tamper switch for self protection. The tamper switch is connected with the alarm device 4 and generates an alarm when the shock sensor 1 is subjected to damage.

While certain embodiments have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:

1. A shock sensor for detecting an attack on a facility equipped with the shock sensor, the shock sensor comprising:
   a microprocessor;
   a mode setting input device connected with the microprocessor and configured to receive first inputs to selectively set the shock sensor to a sensitivity determining mode, the mode setting input device having a first toggle switch that is operable by a user to provide the first inputs;
   a sensitivity adjusting input device connected with the microprocessor and configured to receive second inputs, the sensitivity adjusting input device having (i) a second toggle switch that is operable by the user to provide the second inputs and (ii) a potentiometer that is operable by the user to provide the second inputs;
   an output device in communication with the microprocessor; and
   a micro electromechanical system in communication with the microprocessor, the micro electromechanical system comprising:
      a shock sensing device configured to sense a shock signal generated by an attack in any direction; and
      a microchip operably integrated with the shock sensing device and configured to (i) receive and store a first threshold parameter from the microprocessor, (ii) compare the shock signal sensed by the shock sensing device with the first threshold parameter, and (iii) send an interrupt instruction to the microprocessor based on a result of the comparison,
   wherein the microprocessor is configured to (i) transmit the first threshold parameter to the microchip, (ii) receive the interrupt instruction from the microchip, and (iii) operate the output device to output information in response to receiving the interrupt instruction,
   wherein, while in the sensitivity determining mode, (i) the micro electromechanical system is configured to record an amplitude of the shock signal generated by a desired attack that is simulated in a predetermined time period, and (ii) the microprocessor is configured to determine the first threshold parameter based on the amplitude of the shock signal, wherein, when the first threshold parameter is determined in the sensitivity determining mode, the shock sensor is switched from the sensitivity determining mode to a mode other than the sensitivity determining mode, and wherein, while in the mode other than the sensitivity determining mode, the microprocessor is configured to determine the first threshold parameter based on the second inputs received at the sensitivity adjusting input device, the second toggle switch of the sensitivity adjusting input device selecting a sensitivity range for the shock sensor, the potentiometer of the sensitivity adjusting input device setting the first threshold parameter within the selected sensitivity range.

2. The shock sensor as claimed in claim 1, wherein one of:

the microchip includes a serial peripheral interface, and the microprocessor includes a corresponding serial peripheral interface connected with the serial peripheral interface of the microchip; and the microchip is in communication with the microprocessor in a wireless manner.

3. The shock sensor as claimed in claim 1, wherein at least one of:

the shock sensing device is an acceleration sensing device;

the shock sensing device is configured to sample the shock signal at a sampling frequency of about 2 kHz; and the output device is an alarm device.

4. The shock sensor as claimed in claim 1, wherein the microchip is programmable and comprises (i) a first register configured to store the first threshold parameter received from the microprocessor, (ii) a second register configured to store the shock signal received from the shock sensing device, (iii) a memory configured to store a program sequence to compare the shock signal with the first threshold parameter, and (iv) an on-chip interrupt controller configured to send the interrupt instruction to the microprocessor based on the result of the comparison.

5. The shock sensor as claimed in claim 1, further comprising at least one of:

an additional input device having a third toggle switch, the additional input device being connected with the microprocessor, the microprocessor being configured to determine a second threshold parameter that is taken into account when the shock signal is compared by the microchip; and a tamper switch connected with the output device and configured to protect the shock sensor.

6. The shock sensor as claimed in claim 1, wherein:

the shock sensor further comprises an indication device including an LED, the indication device being connected with the microprocessor;

the output device comprises an optical alarm device and an acoustic alarm device; and the indication device is configured to assist in setting a sensitivity of the shock sensor and to function as the optical alarm device.

* * * * *